April 4, 1961 H. R. BILLETER ET AL 2,977,972
LIQUID-LEVEL CONTROLLED DEVICES
Original Filed June 1, 1955
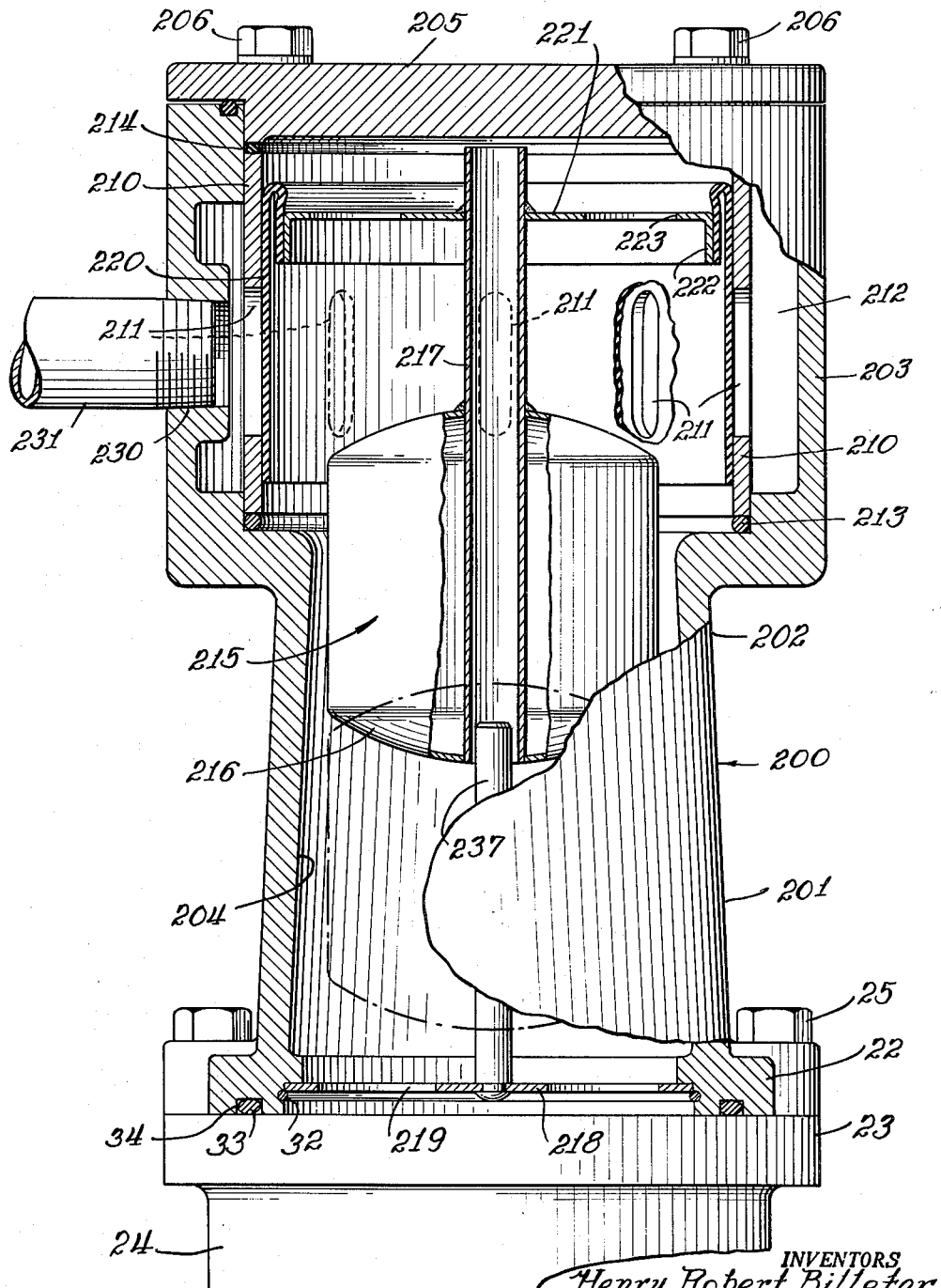
INVENTORS
Henry Robert Billeter
and George B. Richards

United States Patent Office 2,977,972
Patented Apr. 4, 1961

2,977,972

LIQUID-LEVEL CONTROLLED DEVICES

Henry Robert Billeter and George E. Richards, Deerfield, Ill., assignors to Liquid Controls Corporation, North Chicago, Ill., a corporation of Illinois Original application June 1, 1955, Ser. No. 512,551. Divided and this application Nov. 19, 1958, Ser. No. 775,045

8 Claims. (Cl. 137—202)

This invention relates to liquid-level controlled devices. More particularly, it relates to a novel device of the type wherein valve means is controlled in accordance with the level of a liquid in a container.

Devices having a valve or valves controlled by the level of a liquid in a container are in wide use. Among such devices are air eliminators for removing air or other gases from liquid lines. In air eliminators of conventional construction a chamber having a valve-controlled outlet is connected to a liquid line and a float is disposed in the chamber and is connected to the valve for opening or closing the valve in accordance with the liquid level in the chamber. Thus, so long as air continues to enter the chamber from the liquid line, the liquid level does not rise and the float remains at a low level so that the valve remains open. However, when the air no longer enters the chamber, the liquid level rises and lifts the float to close the valve and thus pervent further discharge of air and any discharge of the liquid.

Prior air eliminators usually employed a valve of the poppet type. A poppet valve has the disadvantage that when there is a substantial difference in pressures of the fluid on opposite sides of the valve seat, a large force is required to open the valve, which force is difficult to provide by means of a float. Various attempts have been made to provide pressure balancing means for valves for counteracting the unbalanced fluid pressure forces thereon but they have been either complicated in construction or not fully effective. Balanced slide valves also have been employed but the disadvantages thereof, such as the friction inherent therein, has rendered them generally unsatisfactory for use in air eliminators.

Devices embodying float actuated valves also are used for such varied purposes as segregating two immiscible liquids such as petroleum products and water, controlling fluid actuated devices, priming centrifugal pumps and other uses.

An object of the present invention is to provide an improved liquid-level controlled device.

Another object is to provide a liquid-level controlled device having a valve or valves which present substantially no resistance to an opening or closing force regardless of the difference in fluid pressures on opposite sides of the valve seat or seats.

Another object is to provide a liquid-level controlled device having a valve of such construction and arrangement as to be inherently balanced and to present substantially no resistance to an opening or closing force, regardless of the difference in pressure on opposite sides of the valve seat or seats.

Another object is to provide a liquid-level controlled device having a valve or valves of such construction and arrangement that the difference in fluid pressure on opposite sides of the valve seat or seats serve to aid in maintaining the valve or valves closed but presents no substantial resistance to opening or closing of the valve or valves.

Still another object is to provide a liquid-level controlled device which is simple and inexpensive to build, strong and rugged in construction, effective in operation and which requires a minimum of servicing, repair of replacement of parts over a long period of use.

Another object is to provide a new and improved valve.

Other objects and advantages of the invention will appear from the following description taken in connection with the appended drawing wherein:

Figure 1 is a side elevational view of an air eliminator embodying our invention, with portions broken away and in section.

Referring now particularly to Fig. 1, there is shown an air eliminator which includes a head 200 formed by a hollow casing 201 having a bottom flange 22 by which the head is secured to a flange 23 of a tank 24 which may be of any conventional construction. The head 200 is secured to the tank 24 in any suitable manner, as for example by machine screws 25.

The interior of the air eliminator tank 24 communicates with the interior of the head 200 through openings 219 formed in a plate 218, the purpose of which will appear hereinafter, which plate is secured in the casing 201 in a suitable manner, as by a spring ring 32. The joint between the head 200 and the tank 24 is sealed in a suitable manner, as by an O ring 33 disposed in a groove 34 in the bottom face of the flange 22. The casing 201 is of circular cross-section throughout, with a lower cylindrical portion 202 and an upper generally cylindrical portion 203, preferably of larger diameter than the lower portion 202. The casing 201 thus defines a float chamber 204 having a reduced lower portion and an enlarged upper portion. The casing, as will be seen from the drawing is generally unitary in construction and is closed by a cover 205 suitably secured to the casing 201 as by screws 206. Disposed within the upper portion 203 of the casing and secured therein as by the cover 205 is a cylindrical orifice plate 210 which forms with the upper casing portion 203 an annular chamber 212. The orifice plate 210 is provided with a plurality of circumferentially spaced, vertically elongate orifices 211 which provide communicatiton between the float chamber 204 and the chamber 212.

The orifice plate 210 is sealed in the upper casing portion 203 by a sealing ring 213 between the orifice plate 210 and the casing portion 203 and sealing ring 214 between the orifice plate 210 and the cover 205.

A float 215 including a ball portion 216 and a hollow stem 217 is disposed in the float chamber 204 for vertical movement therein and is guided by a post 237 which is secured in and projects vertically upwardly from the plate 218 provided with the openings 219 which as aforesaid permit communication between the float chamber 204 and the chamber (not shown) of the main portion of the air elimnator or tank 24 which is adapted to be connected to the fluid line (not shown). The hollow stem 217, in addition to serving as means for guiding the float 215 along the post 237 for vertical movement, also serves as a stop to limit the upward movement of the float 215 by abutment against the cover 205.

A valve 220 is provided for controlling the opening and closing of the orifices 211. This valve takes the form of a flexible sleeve formed from a suitable flexible resilient material such as synthetic rubber or other plastic material having suitable properties. The sleeve or valve 220 is secured at its lower end to the orifice plate 210 adjacent the lower end thereof as by an adhesive and is secured at its upper end to a spreader plate 221 which is secured to the hollow stem 217 and has a flange 222 depending from the main body of the plate 221 in a direction parallel to and spaced inwardly from the orifice plate 210. The spreader plate 221 is provided with a plurality of openings 223 which permit liquid or gas to flow therethrough so that there is no interference with the vertical movement of the spreader plate and the connected float. The upper end of the sleeve 220 is adhesively secured to the flange 222 of the spreader plate 221.

The sleeve or valve 220 is supported by the orifice plate 210 and by the spreader plate 221 by securement at its ends to each of the aforementioned members with the portion of the sleeve 220 intermediate its ends being free and capable of being flexed upon vertical movement of the spreader plate 221 and the connected members. The sleeve 220, due to its shape and resiliency extends along and in firm engagement with the inner face of the orifice plate at the portion upwardly of the secured end to an extent determined by the position of the float 215. The portion of the sleeve 220 which is not in engagement with either the cylindrical orifice plate 210 or the spreader plate 221 is free to adjust itself to an arcuate shape as shown.

The casing portion 203 is provided with an outlet 230 which threadedly receives a pipe 231 which communicates with the chamber 212 and, through the orifices 211 communicates with the float chamber 204. Thus, when air or other gas is expelled from the float chamber 204 by the rising of the level of the liquid in the float chamber 204, such air or other gas is carried away from the chamber 212 by the pipe 231.

In the operation of the invention illustrated in Fig. 1 the tank 24 is suitably connected to a liquid line (not shown) from which it is desired to remove air. Assuming that the air has been removed and the liquid stands in the head 200 at a level sufficient to raise the float to its uppermost position, the valve 220 is in closed position. Thus the valve lies against the orifice plate 210 and extends entirely over and sealingly closes the orifices 211, so that no liquid can escape from the head.

It will be noted that the valve 220 lies flat against the orifice plate throughout a substantial zone thereof and particularly a zone on both sides of and above and below the orifices 211, so that the latter are fully closed. The spring pressure provided by the valve 220 by reason of its resiliency and arcuate form insures that the closing portions thereof are maintained against the orifice plate regardless of whether or not the air or liquid within the float chamber 204 is under pressure.

When air (or other gases) enters the float chamber 204 from the liquid line, such air displaces the liquid in the float chamber 204 and causes the level to fall. When this occurs, the float 215, which is buoyantly supported by the liquid, also falls and carries with it the stem 217 to which the valve 220 is connected, through the spreader plate 221. The downward movement of the stem 217 causes the spreader plate 221 to move downwardly in a direction parallel to the face of the orifice plate 210, with the result that the portions of the valve 220 which previously lay against the orifice plate 210 are stripped or "peeled" away from the orifice plate 210 progressively downwardly and as the downward movement of the float continues the orifices 211 are progressively uncovered in a direction from the upper portions thereof toward the lower portions.

Regardless of the differences in the pressures on the two sides of each of the valve seats, namely the pressure inside the float chamber and the pressure in the chamber 212, there is substantially no resistance to the opening force exerted on the valve by the downward movement of the float. It will be seen that while there is a pressure differential on the two sides of the valve, which is applied over those portions of the face of the valve which overly the corresponding orifices and which force tends to maintain the valve against the orifice plate to close the orifice, nevertheless this force is not substantially effective in opposing the opening of the valve. It will be seen that the valve is progressively pulled away from its orifice plate and, owing to the resilience of the valve and the arcuate shape into which the valve is forced by the manner in which it is attached to the casing and to the spreader plate, the valve is moved away from the orifice plate in progressively small increments so that only a small portion of the area of the valve which overlies the orifice plate is moved away from the plate at any instant. Thus, the orifices are progressively uncovered in small increments and any force opposing the movement of such small increments of the valve away from the orifice plate is extremely small.

The valve 220 is so supported and the arrangement of the associated elements is such that the free portion of the valve has at least a portion which retains a bowed form in all positions of the float. Thus it will be seen that as the float moves downwardly and carries with it the corresponding end of the valve which is secured to the spreader plate the portion of the valve adjacent the end which is attached to the casing is progressively curved and is peeled away from the orifice plate.

As soon as the orifices 211 have been uncovered by the above-described opening movement of the valve 220, the air or gas trapped in the float chamber above the level of the liquid in the system and which normally is under some pressure is caused to flow out of the float chamber through the orifices 211, the chamber 212 and the vent pipe 231 by which it is conducted to a point of disposal.

When the air or other gas has been discharged to such an extent that the liquid level rises sufficiently to support and lift the float 215, the latter is elevated and causes the valve 220 to be moved in a reverse direction to that described above in connection with the opening of the valve. That is to say that as the float 215 moves upwardly the valve is caused to progressively move against the orifice plate to an increasing degree and to progressively close the orifices until the latter are completely closed and the valve extends in contact with the orifice plate both above and below the orifices. When the valve is closed no further air or gas can escape from the float chamber. It will be understood that during the upward movement of the float and the progressive movement of the outer portions of the valve into increasing engagement with the orifice plate, no significant amount of energy is required to effect this movement of the valve.

It will be noted that the valve 220 takes the form of a cylindrical sleeve and is completely balanced in a direction transversely to its vertical axis so that normally there is no engagement between the float 215 and the guide post 237 under normal conditions. Moreover, the valve 220 is maintained against the orifice plate by its own inherent resilience, aided by the pressure within the float chamber 204 where such pressure exists and thus closes the orifices when in its upper position.

However, it should be noted that where a spreader plate is employed which has a short flange such as the spreader plate 233 of Fig. 1, the valve will not necessarily retain the same curvature through its entire range of movement. Under such circumstances, it may be found that a slightly greater force is required to effect operation of the valve than would be the case where the flange is sufficiently long to insure that the valve retains the same curvature in all positions.

However, the valve 220 as illustrated is of such construction that upon an opening or closing movement of the valve, effected by the vertical movement of the float 215, as controlled by the level of the liquid in the float chamber 204, the valve 220 changes its shape and position under such control but at the same time the free portion retains its arcuate shape and no substantial force is required to effect such change in shape and position, inasmuch as the amount of energy required to effect the bending of the valve element is provided by the valve element itself at the portion at which it is flattening or returning to cylindrical shape. Moreover, since the valve element 220 moves between open and closed position or vice versa in a manner which provides for the progressive uncovering or closing of the orifices, there is substantially no significant resistance or opposition to the opening of the valve 220.

The invention provides an extremely simple and reliable form of air eliminator which can be constructed very inexpensively and which at the same time provides reliable and effective operation over a long period of use without the necessity for servicing, repair or replacement of parts. Owing to the fact that the air eliminator and particularly the valve thereof is completely symmetrical about the vertical axis of the device, the possibility of any appreciable unbalance of forces in the device is practically eliminated. Moreover, because of the cylindrical form of the device not only is it completely balanced but at the same time it can be so constructed as to provide a very large capacity for the outflow of air or other gases, for any particular size of air eliminator head.

The present invention also is excellently well adapted to application to a fluid segregator. As will be understood a fluid segregator is employed in order to separate two fluids of different densities or specific gravities as for example a petroleum product and water. Such segregation is effected by causing the liquids to flow into a container whereby the heavier of the two liquids settles to the bottom of the container and accordingly may be withdrawn while the lighter of the two liquids rises toward the upper portion of the container and floats on the heavier liquid. The separation of the liquids is effected by controlling the outflow of the heavier liquid by means of a float controlled valve so that the heavier liquid flows out of the container until such time as the heavier liquid is substantially entirely withdrawn from the container whereupon the valve is closed so that none of the lighter liquid is permitted to flow from the container. In other words, the fluid segregator operates in a manner somewhat analogous to the air eliminator except that instead of removing the lighter of the two fluids at the top of the apparatus, in the segregator the heavier of the two fluids is removed from the bottom of the device.

It will be seen from the foregoing that the present invention provides a device which is highly effective for separating two immiscible fluids of different specific gravities such as two liquids or a liquid and a gas. The device is applicable to a large number of uses including use as an air eliminator, or as a liquid segregator, or as a control device and others.

The device of the present invention is very simple in construction and may be manufactured at relatively low cost. There is substantially no wear of the parts and there is a minimum requirement for repair, adjustment or replacement over a long period of use.

The device is relatively compact for any predetermined capacity and it may be made in a wide range of sizes for various applications.

The valve construction is not only very simple and therefore does not require complicated parts or mechanisms but is highly effective and there is no leakage past the valve at either high or low pressures.

The construction of the valve and its actuating mechanism is such that there is substantially no resistance to opening or closing and therefore the valve may be opened or closed with an extremely small force. In all of the forms of my invention the valves are balanced so that there is substantially no opportunity for frictional resistance upon the movement of the float. Because of the foregoing a very light float may be employed for operating the valve or valves and no linkage is required.

The valve is self closing and no special closing means is required. Moreover, the pressure differential across the valve seat aids in maintaining the valve closed but at the same time does not interpose any significant resistance to the opening of the valve.

This application is a division of our copending application Serial No. 512,551, filed June 1, 1955, now abandoned, of which our co-pending application No. 775,077 filed November 19, 1958, is also a division.

We claim:

1. A liquid-level controlled device, comprising a casing defining a float chamber and having an inlet opening into said chamber and a cylindrical wall portion provided with an outlet orifice, float means including a valve-actuating element guided for movement in said chamber and a valve element including a flexible resilient sleeve member secured at one end to said valve-actuating element and at the other end to said casing in a position whereby a portion of said sleeve lies flat against said wall portion in sealing relation to said orifice when said actuating element is in one position and is displaced from said orifice when said actuating element is in another position, and the portion of said sleeve member intermediate said secured portion is curved back upon itself, said sleeve member being open at both ends with its interior communicating with the interior of said chamber whereby fluid flowing from said inlet to said orifice passes through said sleeve member, and the intermediate portion of said sleeve member is exposed on both faces to equal fluid pressure.

2. The device as set forth in claim 1 wherein a plurality of vertically elongate outlet orifices are provided in said cylindrical wall portion.

3. The device as set forth in claim 1 wherein said actuating element is in axial alignment with said cylindrical wall portion.

4. The device as set forth in claim 1 wherein said actuating element includes a spreader having a cylindrical portion with a surface concentric with said wall portion and to which surface said sleeve member is secured, said spreader having an opening therein through which fluid may flow from said inlet to said orifice.

5. A liquid-level controlled device, comprising a casing defining a float chamber and having an inlet opening into said chamber and a tubular wall portion provided with an outlet orifice, float means including an actuating element guided for vertical movement in said chamber and a valve element including a flexible, resilient tubular sleeve member secured at one portion to said actuating element and at the other portion to said casing in a position whereby a portion of said sleeve member lies flat against said wall portion in sealing relation to said orifice when said actuating element is in one position and is displaced from said orifice when said actuating element is in another position, and the portion of said sleeve member intermediate said secured portions is curved back upon itself, said valve element having openings therein providing communication between the interior of said sleeve member and the interior of said chamber whereby fluid flowing from said inlet to the orifice passes through said valve element, and the portion of said sleeve member which is curved back upon itself is exposed on both faces to equal fluid pressure.

6. A liquid-level controlled device, comprising a casing defining a chamber and having an inlet opening into said chamber and a cylindrical wall portion provided with an outlet orifice, a spreader guided for movement in said chamber and a valve element including a flexible, resilient sleeve member secured at one end to said spreader and at the other end to said casing in a position whereby a portion of said sleeve member lies flat against said wall portion in sealing relation to said orifice when said spreader is in one position and is displaced from said orifice when said spreader is in another position, and the portion of said sleeve member intermediate said secured portion is curved back upon itself, said sleeve member being open at both ends with its interior communicating with the interior of said chamber whereby fluid flowing from said inlet to said orifice passes through said sleeve member, and the intermediate portion of said sleeve member is exposed on both faces to equal fluid pressure.

7. A liquid-level controlled device, comprising casing means defining a float chamber and having an inlet opening into said chamber and a cylindrical surface portion provided with an outlet orifice, float means including a valve-actuating element guided for movement in said chamber and a valve element including a flexible resilient sleeve member secured at one end to said valve-actuating element and at the other end to said casing means in a position whereby a portion of said sleeve member lies flat against said surface portion in sealing relation to said orifice when said actuating element is in one position and is displaced from said orifice when said actuating elemen is in another position, and the portion of said sleeve member intermediate said secured portion is curved back upon itself, said actuating element having an opening therein whereby said sleeve member is exposed on both faces of said intermediate portion to the same fluid pressure.

8. A liquid-level controlled device comprising means defining a float chamber and having an inlet opening into said chamber and a cylindrical surface portion provided with an outlet orifice, float means including an actuating element guided for vertical movement in said chamber and a valve element including a flexible, resilient tubular sleeve member secured at one portion to said actuating element and at the other portion to said means in a position whereby a circumferentially continuous portion of said sleeve member lies flat against said surface portion in sealing relation to said orifice when said actuating element is in one position and is displaced from said orifice when said actuating element is in another position, and the portion of said sleeve member intermediate said secured portions is curved back upon itself, said actuating element having an opening therein providing communication between the portions of said chamber on opposite sides of said sleeve member whereby said actuating element is exposed on both faces of said intermediate portion of the same fluid pressure.

References Cited in the file of this patent
UNITED STATES PATENTS

| | | |
|---|---|---|
| 2,679,863 | Tucker | June 1, 1954 |
| 2,720,218 | Otto | Oct. 11, 1955 |